Patented Jan. 22, 1935

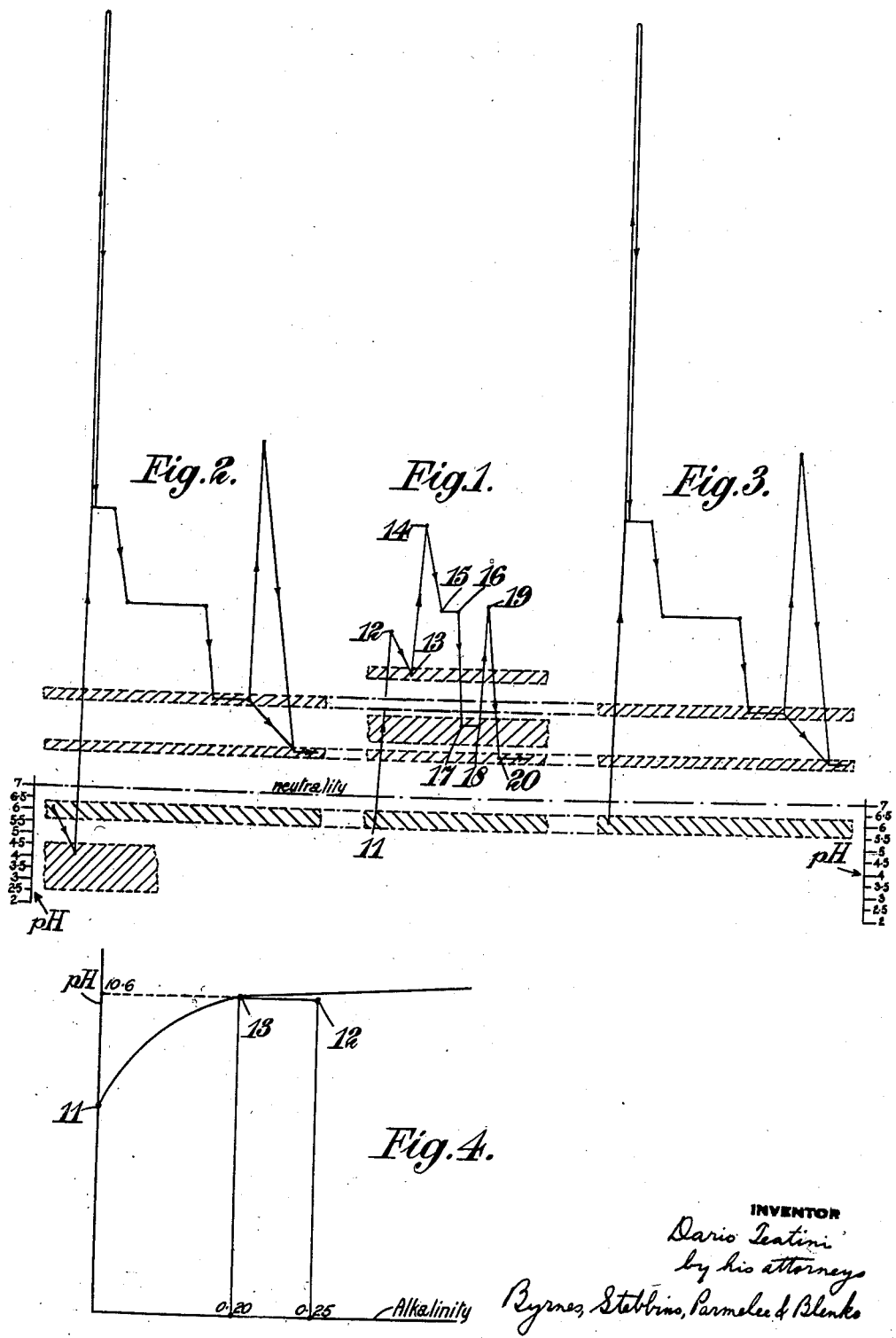

1,988,923

UNITED STATES PATENT OFFICE 1,988,923

PURIFICATION OF SUGAR JUICES

Dario Teatini, Hougaerde, Belgium, assignor to Utilities Improvements Limited, London, England, a British company Application April 3, 1931, Serial No. 527,451
In Portugal January 30, 1931

15 Claims. (Cl. 127—50)

This invention relates to a process for the purification of sugar juices and relates particularly to purification of factory and refinery beet sugar juices, and has for an object the more complete purification of sugar juices at lower cost than has hitherto been possible.

Methods chiefly in use for the removal of impurities from sugar juice in beet or cane sugar manufacture comprise the well known carbonation and sulphitation processes. In both of these the juice is defecated with lime, excess of which is later neutralized, by carbonic acid in the first-named process and by sulphur dioxide in the second. Processes have also been suggested in which the sulphur dioxide is added to the juice first, the lime treatment following.

These processes, with variations, such as the simultaneous application of lime and sulphur dioxide and/or carbon dioxide, and, in fact, the whole art as commercially known, have required the use of considerable quantities of lime in excess of those necessary for achieving the purely chemical reactions of the defecation process. For this, involving the neutralization of the acidity of the juice, production of organic lime salts, etc., a comparatively small percentage of lime is needed, probably less than 0.5 per cent CaO. It has generally been believed, however, that high alkalinity was required for good juice purification, and lime up to at least 2% or even up to 3.5% on the amount of the juice was commonly used in the first liming, with further amounts of lime added in some cases in the later steps of the process. It was supposed that the excess of lime, under the action of $CO_2$ or $SO_2$, being transformed into calcium carbonate or sulphite; the large number of crystals thus formed probably had the effect of a sweeping mass, entraining certain of the non-sugars which remained in suspension; the colloids having their flocculation points at the various points of pH attained during carbonation or sulphitation would be to some extent adsorbed upon the surfaces of the small crystals. The colloids, so far as they were removed, (which was to a small degree only), were doubtless chiefly removed by such action, at the expense of considerable outlay of lime. All the colloids, having different points of flocculation could not be removed for an active (non-flocculated) colloid cannot be retained or eliminated. The percentages of lime to be used were determined more or less empirically, the minimum dose being determined very largely by considerations of the requirements for good filtration of the juices when carbonated, requirements in regard to the press cakes formed by the carbonates and of the color of the juice obtained after filtration. These requirements all occasioned the use of considerable amounts of lime, in the processes heretofore used, and the lime additions were never calculated with a view to obtaining the most favourable hydrogen ion concentration, thereby to neutralize the electric charges on the colloids contained in the juice.

The said known processes, for all their large outlay of lime, and in spite of the limpid appearance of the purified juice, failed to remove a considerable proportion of the non-sugars, consisting of colloidal organic matter, mineral matter, etc.

As a result of chemical and ultra-microscopic investigations I have ascertained that sugar juices purified by the sulphitation and carbonation methods mentioned above still contain considerable amounts of colloidal impurities as revealed by the ultra microscope, although apparently clear and bright. In certain cases indeed no appreciable decrease in the amount of colloids was noticed after subjecting the juices to the purifying processes. It is an object of this invention to remove these colloidal impurities together with certain non-colloidal impurities adsorbed by them while reducing the cost of manufacture of the finished product.

Other objects comprise the purification processes and steps thereof hereinafter more fully set forth, and particularly pointed out in the appended claims.

The process presently to be described effects flocculation of the colloids, by producing suitable hydrogen ion concentrations in the juice, under favourable conditions, so as to neutralize largely the electric charges carried by the colloids. This is done with a considerable saving in lime, or equivalent, in comparison with former methods, the new process requiring, for beet sugar, a total amount of lime which is usually in the neighbourhood of one per cent on the juice, or less, of which 0.3 per cent or less is used in the first, or flocculation, step. This, and the more efficient removal of the colloids, results in various savings throughout the process, as well as an improved purification, as will be explained hereinafter.

I have ascertained that the individual colloids constituting part of the impurities in raw sugar juice have well defined iso-electric points and that at these points under suitable conditions of temperature and alkalinity flocculation of the colloids takes place with comparative readiness. I have found that in dealing with these colloidal impurities in sugar juice consisting of a number of colloids each having different properties and in particular possessing different iso-electric points, it is obviously impossible commercially to obtain the optimum conditions for the flocculation of each particular colloid in carrying out the process of purification and according to my invention, I select that value of pH and alkalinity at which in a process such as will now be described, irreversible flocculation of the colloidal impurities occurs to a maximum extent, and these values define what is hereinafter referred to as "the optimum iso-electric point".

In reference to the above, it should be noted that pH value is a measure of the hydrogen ion concentration of the juice, i. e., a matter of the extent of dissociation of substances in solution. This bears no direct relation to the alkalinity or acidity of the juices as obtained by titration, which only indicates the ability of the solution to neutralize acid or alkali. For example, the alkalinity of limed sugar juice, as measured by the usual chemical tests, depends upon the total amount of dissolved lime, whereas the pH value increases only as the added lime dissociates. Further, as lime is added, the rate of dissociation decreases, and a point is reached at which the pH value practically ceases to rise while additions of lime continue to increase the alkalinity so far as the lime is dissolved.

According to one embodiment of this invention, raw sugar juices are heated to a predetermined temperature (if not already at a suitable temperature when the process is started), alkali is added in regulated amount so as to raise the pH value of the mixture to that of the optimum iso-electric point of the colloidal constituents to be flocculated (and the alkalinity to a point slightly above the optimum) and liquid sulphur dioxide is added and thoroughly mixed in amount sufficient to reduce the alkalinity of the mixture to that of the optimum iso-electric point thus provoking the rapid and irreversible flocculation of the colloidal impurities. The optimum iso-electric point will lie in the alkaline range, and, in the case of diffusion beet sugar juice, usually about pH 10.6 or a little higher.

The invention is based upon and in accordance with several observations and discoveries, which will now be stated more fully. A point of pH value and alkalinity can be found in the alkaline range for raw sugar juices, at which flocculation of nearly all of the various colloids contained in the juice can be effected, at a suitable temperature, after treatment with an alkali such as lime and an acid electrolyte such as sulphur dioxide. The flocculation is markedly a maximum when the pH of the juice is substantially at this point, and is then exceedingly rapid whereas with a higher or lower pH the settling of the flocs is slower and the super-natent liquid is not as clear, etc.

The mechanism of the process is believed to be as follows:

When the juice is brought, by the addition of the lime, to the ionic concentration which I term the optimum iso-electric point, flocculation of at least some of the colloids occurs, because the electric charges on these colloids are, completely or nearly, neutralized by the charges carried by the ions dissociated from the lime. This pH value of the juice must not be exceeded, or only slightly, or the charges carried by the colloids will be, not neutralized, but reversed in sign. The alkalinity of the juice, by chemical test, may be, however, and advantageously is, increased somewhat beyond that alkalinity which is attained by the minimum dose of alkali required to attain that pH value.

With the diffusion beet juices usually met in practice, not all of the colloids in the juice will be flocculated by this procedure, but may be by the subsequent treatment with the sulphur dioxide. It appears that this second electrolyte, dissociating in the juice, provides ions which neutralize the charges on colloids which are not neutralized by the ions of the alkali electrolyte, and that these charges are thus neutralized at the same pH value of the juice as that at which the neutralization of certain charges by the alkali was effective, this being the optimum iso-electric point. The second electrolyte must be just sufficient in amount to cancel the charges which are susceptible to be neutralized by its ions, without substantially reducing the pH value of the juice, as that would replace the charges on the colloids which were flocculated by the lime, and cause them to dissolve. When this has been done, the (chemically tested) alkalinity of the juice will be reduced to substantially that corresponding to the optimum iso-electric point, viz. that alkalinity which is attained by the minimum dose of alkali required to attain the pH value corresponding to that point, as previously stated.

Such procedure is facilitated by the fact that the lime added, as described, with beet sugar juices, may be calculated to attain the desired pH value in the juices with a slight excess of alkalinity above that corresponding to the said pH value, as will be further explained hereafter.

When this procedure has been followed the flocculation will be substantially irreversible, that is, additions of lime etc. in the subsequent process, will not cause deflocculation. The action by which the flocs are thus rendered stable is thought to be as follows:

When all the colloids are flocculated at their iso-electric point in order that these same colloids can repass into colloidal solution (reversible flocculation) it is necessary that they acquire a new electrical charge. This new electrical charge can arise from a large number of causes which are, however, checked in their effects by the complexes formed in the juice under the action of the alkali and of the acid. These complexes play the part of buffers (checks) or in other terms of stabilizers of the flocculation.

The action of these stabilizing bodies appears to be at a maximum when they are formed in the zone of the optimum iso-electric point of the flocculated colloids. That is why, if the doses of alkali and acid are not well determined, not only is the flocculation incomplete, but there is the risk of subsequently causing a part of the colloids already flocculated to return to colloidal solution.

In regard to the lack of change of the pH value after the $SO_2$ treatment, a further explanation may be desirable. When a weak dose of $SO_2$ (or any other acid) is introduced into the juice, even if this $SO_2$ transforms into salt a small fraction of the alkalies, the pH will not change, for an equal fraction of alkali which was not dissociated in the initial state of equilibrium will pass into the dissociated state to reestablish in the juice the same state of equilibrium of dissociation. But by the fact that a small amount of alkali has been transformed by the acid, it is evident that the alkalinity will have decreased by an amount equivalent to the amount of the alkali thus destroyed.

The above is possible because of the slight excess of alkali over that corresponding to, that is, required for, the attainment of the optimum pH. If this slight reserve of alkali did not exist, after the acid treatment there would be established a new equilibrium of dissociation, but with a total number of alkaline ions lower than the total number before the acid treatment, and the pH would be lower than its optimum value, producing a less efficient flocculation.

It should also be noted, in connection with the above that suitable temperature conditions, as previously stated, are of importance in carrying out the flocculation, for below a certain determinable minimum temperature flocculation proceeds slowly and unsatisfactorily.

In one method of carrying the process of this invention into effect the alkali added to the raw sugar juices to raise the pH value to that of the optimum iso-electric point, and the alkalinity above that of the optimum iso-electric point, consists of lime and this may be added in the form of an aqueous suspension. In a preferred modification of the process a portion of the limed and treated juices obtained during subsequent operations on a previous charge of sugar juice may be added to the raw juices in order to raise their alkalinity above that required for the optimum condition of irreversible flocculation of the colloidal constituents.

The temperature of the raw juices at the stage at which alkali is added should lie between 15° C. and 95° C., the preferred temperature being 85° C.

The application of the invention and the results obtained by its use are represented diagrammatically in the drawings in which:—

Figure 1 represents the present process in graphical form, as applied to beet sugar juices.

Figure 2 represents in graphical form a process of purification involving sulphitation of diffusion juice.

Figure 3 represents in graphical form a process of purification of sugar juices employing carbonation without sulphitation.

Figure 5:
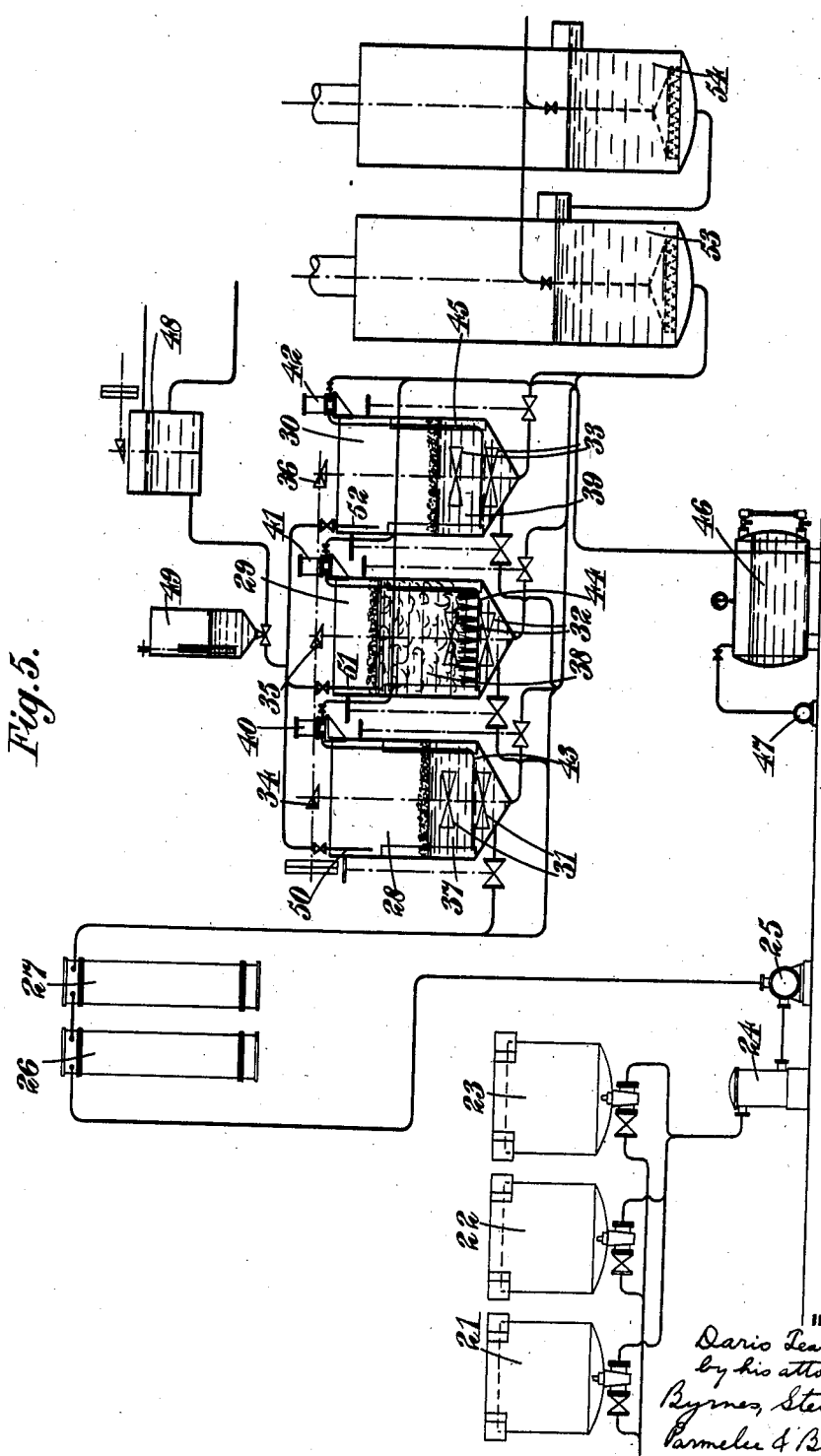

In Figures 1, 2 and 3 the pH values of points below the neutrality line on the graphs are indicated by reference to the pH scale attached while those portions of the graphs above the neutrality line represent the degree of alkalinity of the liquid to phenol phthalein.

Figure 4 shows the relationship between the pH value and the alkalinity of the juices during the steps of adding lime and adding sulphur dioxide in the present process.

Figure 5 represents diagrammatically an apparatus for carrying the process of the present invention into effect.

Referring to Figures 1 and 4, 11 represents the raw sugar juice having a pH of about 6. 12 represents the juice to which lime has been added to raise its pH to or inappreciably above the optimum iso-electric value (about pH 10.6) and its alkalinity above the optimum. 13 represents the point at which the optimum alkalinity has been reached by the addition of liquid sulphur dioxide for the most rapid flocculation of the colloidal impurities and the small reduction in pH accompanying the relatively large alteration in alkalinity is clearly shown by the positions of the points 12 and 13 on the graph of Figure 4 in which alkalinity, in a typical case, is indicated in percentages of total CaO on the beets. 14 represents the juice after the further or supplementary addition of lime (0.4 to 1.0% on the juice) the alkalinity of the liquid rising sharply above that for optimum flocculation and the pH rising also but to a very slight degree (see Figure 4). Between 14 and 15 on the graph the juices are treated with carbon dioxide in the first carbonation process until an optimum alkalinity of 0.025 to 0.08 grm. CaO per 100 ccs. is attained. Between 15 and 16 there is a maximum buffering, due to the maximum precipitation of calcium carbonate, this level representing what is known as the "break" in common carbonation practice. Between 16 and 17 carbon dioxide is still passed and the alkalinity falls continuously. At the point 17 the first carbonation is finished and the juice is filtered in the first carbonation filter presses. The zone in which the point 17 lies represents the limits of alkalinity most favourable to the efficient removal of precipitated colloidal impurities and calcium carbonate. This filtration takes place at an optimum pH considerably lower than that obtaining in the ordinary calco carbonation process illustrated in Figure 3. The carbonation stage as above described is the same as in common practice, except that in the present process it is possible to push the carbonation to a lower limit of alkalinity than is usual.

I believe that the possibility of carbonating to a lower point is a resultant of previously having caused the flocculation to become irreversible. In other processes were such a low limit of alkalinity to be attained the juices would become dark-coloured due to the repassing into solution of organic matter, and the fact that such darkening does not occur in the present process at the low level of alkalinity indicated by points 17 and 18 in Fig. 1 is an indication of the truth of the statement that the flocculation is not reversed during the various stages subsequent to the flocculation, as described, indicated by the diagram, Fig. 1 points 13 to 17.

I note an advantage resulting from the pushing of the first carbonation to the low level described, namely that the filters employed after second carbonation can be used for a longer period, due to the smaller amount of calcium carbonate produced by the carbonation of the smaller amount of lime remaining in the juice after the first carbonation filtration.

Between 17 and 18 the liquid has a pH between 9 and 10.5 which corresponds with another iso-electric point at which further vestiges of colloidal impurities are flocculated. The juices are subjected to a further lime treatment between 18 and 19 with a consequent increase in alkalinity and to a second carbonatation between 19 and 20 while the dotted line between the points 18 and 20 represents the change brought about when more carbon dioxide is passed through the liquid without adding further lime, as is the practice of some operators.

It may be remarked that Fig. 4 was drawn from the results of experiments on diffusion juices taken in various beet sugar factories during the last (1930-1931) campaign. Diffusion juices were heated to 85° C, treated with increasing amounts of chemically pure CaO, and for each addition of CaO the total alkalinity to phenolphthalein and the hydrogen ion concentration of the juice were determined, and the results interpreted in graphic form, Fig. 4 is similar to the graphs thus obtained, and shows in addition the effect of the $SO_2$ treatment, the alkalinities shown as abscissæ being percentages of the juice. It was noticed from the said experiments that the alkalinity of the juice increases accordingly as the lime is increased, (but not entirely continuing in proportion), while the pH values increase at first very rapidly, and then attain a value which varies but little. The reasons why the pH curve takes a form similar to that illustrated need not here be gone into.

Comparing Figures 2 and 3 with Figure 1 it is seen that the present process involves a great saving in lime and in the carbon dioxide used in the carbonation stages of purification, and the relationship of the present process to the sulphitation process in which gaseous sulphur dioxide is used (Figure 2) is also made clear. To make the comparison clearer, it is noted, referring to Figure 3, that in the ordinary carbonation process the raw juice, of a pH value somewhat as indicated at 11$^A$, is carried to a considerable alkalinity as indicated at 21, by the addition of, say, 2 to 3.5 per cent of lime, after which the alkalinity is reduced by carbon dioxide, in the first carbonation, the stages of which are indicated by the lines 21—22; 22—23, 23—24, 24—25 and 25—26. The second liming is shown by the line 27—28, and the second carbonation by line 28—29, while a modified practice is shown by line 27—29, in which the second liming is omitted and further carbon dioxide is passed through the liquid as shown by line 27—29.

In the form of sulphitation process shown by Fig. 2, the raw juice of a pH value as indicated at 11$^B$ is first treated with sulphur dioxide gas, as indicated by the line 11$^B$—30, the subsequent considerable liming being indicated by line 30—31, followed by carbonation (and/or sulphitation) shown by lines 31—22$^B$, etc., the same as described for the carbonation process in connection with Fig. 3.

In Figure 2 the zone shown below the neutrality line represents the fact that flocculation of colloidal impurities takes place under acid conditions when raw sugar juices are treated with sulphur dioxide gas, and Figures 2 and 3 bring out the fact that compared with the present process the ordinary sulphitation and carbonation processes employ large amounts of lime (which has ultimately to be removed by conversion to the carbonate and/or the sulphite by the passage of carbon dioxide and/or sulphur dioxide.)

The zones shown above the neutrality line in Figures 2 and 3 indicate the ranges of alkalinity in which for the processes represented it has been found that the filtration of precipitated impurities from the juices takes place most readily.

Referring now to Fig. 5 one form of the apparatus is illustrated, by which the process may be carried out. As there shown, 5, 21, 22 and 23 are storage tanks for raw sugar juices. 24 is a pulp strainer through which liquid passes to the pump 25 and thence through the heaters 26 and 27 to one or other of the three mixers 28, 29, 30. These mixers are about 9 feet in height and are preferably filled with juice to a depth of 6 to 7 feet. Each mixer is provided with a stirrer 31, 32, 33 driven by gearing 34, 35 and 36. Fixed baffles 37, 38 and 39 within the mixers prevent the whole mass of liquid from rotating with the stirrers, which must rotate at a speed sufficient to bring about effective mixing but insufficient to cause frothing of the liquid.

In a practice which is quite usual one of the three mixers contains juices undergoing treatment with sulphur dioxide while untreated juices are being run into the second and juices which have already been treated are being run from the third mixer, and the process is thus made continuous.

Liquid sulphur dioxide measured in sulphitometers 40, 41 and 42, one for each mixer, is passed into the juices through pipes 43, 44 and 45, and is fed to the sulphitometers from a container 46 under the pressure of the sulphur dioxide itself or where this is insufficient by means of compressed air supplied by a compressor 47.

The sulphitometers are preferably of glass and are adapted to measure and deliver the exact amount of liquid sulphur dioxide necessary to treat the measured quantity of sugar juices in the mixer.

Alkali solution is run into the mixers from a storage tank 48 via a measuring tank 49 and pipes 50, 51 and 52, this being the second or supplementary liming referred to above. From the mixers 28, 29 and 30, the treated juices pass to carbonators 53 and 54 and thereafter to apparatus of the usual type for filtering, adding further lime and finally decolorizing.

Following is a description by way of example of one method of carrying the invention into effect.

*Example*

Raw beet sugar juice having a pH of about 6 is heated to 85° C. and the pH value of the mixture is raised to that of the optimum iso-electric point of the colloidal impurities, and the alkalinity of the mixture slightly above that of the optimum iso-electric point by the addition of a portion of the sugar juices which have previously been limed and treated with liquid sulphur dioxide and again treated with lime. The amount of lime added is that necessary to neutralize the acidity of the sugar juices (0.05 to 0.1%) plus that necessary to attain the optimum pH (about 0.20%). When this pH (approximately 10.5 to 11) is attained, liquid sulphur dioxide measured in a closed glass sulphitometer connected with a cylinder of the liquid is run into the alkaline sugar juices with thorough stirring. The amount of sulphur dioxide added is sufficient to lower the alkalinity to the optimum iso-electric value, the pH remaining approximately constant at about 10.5 to 11 under which conditions rapid flocculation of much of the colloidal matter present takes place (due probably to the electrolytic action of the liquid sulphur dioxide and to the attachment of colloidal particles to nuclei consisting of calcium sulphite crystals which are formed by the chemical action of sulphur dioxide in the presence of alkali).

The amount of liquid sulphur dioxide used is of the order of 100 grms. per ton of beet, or about 0.1 grm. per litre of juice. After the addition of sulphur dioxide, 0.40–1.00% of lime is added and the liquid is carbonated to optimum alkalinity in the usual manner.

The juices are then reheated, filtered and decolorized as in the normal process of manufacture.

It will be noted that the maximum purification is achieved by the operations at the optimum iso-electric point, as described, the subsequent operations being chiefly for the purpose of ensuring good filtration of the juice and reduction of the alkalinity before concentration.

It should also be noted that, in the process described, the sulphur dioxide is required for an action which must be preeminently electrolytic, which is only possible if the SO₂ passes to the state of H₂SO₃, immediately dissociating to form SO₃ plus 2H. This is distinguished from the use of SO₂ in the well known sulphitation processes, in which "sulphitation" means a chemical action having as principal object the formation of sulphites, brought about by the neutralization of the alkalies present. Such action resulting predominantly in the formation of sulphites would appreciably lower the pH, and would render the present process less effective. It may be here explained that the action which takes place in the present process is electrolytic rather than chemical, apparently because the SO₂ is discharged quickly, as a liquid, under the relatively high pressure of its own saturated vapour in the sulphitometer, into the body of the juice. Therefore its action is so speedy that it acts chiefly as an electrolyte before it has time to act as a chemical agent. Such a result is more difficult to obtain if sulphur dioxide in gaseous form is used, at least unless it is employed under a relatively high pressure.

It will also be noted that in the present process the first, or alkali electrolyte functions to achieve the desired pH, (with a slight excess of alkalinity), and, evidently, to flocculate certain of the colloids, and the acid electrolyte performs the functions of completing the flocculation of the colloids and of preventing the flocs from dissolving, after formation, because of different conditions in the subsequent steps. As to the flocculating process, it is believed that the colloids of diffusion juice may be grouped in families, which are flocculable, respectively, by ions of the type $Ca^{++}$, and $OH^-$; (produced by dissociation of alkalies of the type $Ca(OH)_2$, and by ions of the type $SO_3^{--}$, and $H^+$, (produced by dissociation of acids of the type $H_2SO_3$). This seems to conform with the results obtained herein, and tends to explain them.

It will also be noted that the acid electrolyte, as sulphur dioxide in the present process, is caused to perform its flocculating and other functions in a medium whose pH is in the alkaline range, thereby avoiding the various difficulties in working which arise when flocculation is caused by sulphur dioxide in an acid medium, such as loss of sucrose by inversion, as in some of the prior processes.

It is further noted that a slight excess of alkalinity, such as is provided, for example, by about 0.20% of lime addition to that required to neutralize the acidity of the sugar juices (as mentioned in the example herein), permits the action of the small amount of sulphur dioxide used to complete flocculation and render the flocs stable, without lowering the pH below the optimum point, as explained above. If, on the other hand, there were a considerable excess of alkalinity, as when much larger quantities of lime are used, (as in prior processes), even if the pH value was not essentially too high, the present process could not be performed. This is, according to my understanding, for two reasons. First, the colloids which should be neutralized by the lime would have their charges, not neutralized, but reversed. As stated, an amount of lime in the neighbourhood of 0.20% only is required to furnish the ions necessary to neutralize these charges. Assuming, then, that, say, 2% of lime is used, as in prior practice, when the ions necessary for the neutralization of charges have been withdrawn from the fluid medium, a further amount of lime will dissociate (as is shown by the ionic theory), producing charged ions which, being in excess of the requirements of charge-neutralization, will effect reversal of the signs upon the colloids. Second, with a relatively large amount of lime the sulphur dioxide would act preferentially upon the lime by the law of mass action, since the lime would be present in greater mass than the inorganic and organic non-sugars. It would therefore act as a chemical agent rather than electrolytically, to neutralize charges on the colloids.

Certain beneficial results of the process may be briefly noted as follows: A. Reduced consumption of lime, as previously described. B. Better purification, chiefly organic, because of the more complete removal of colloidal matter. C. higher yield on crystallization, due to the removal of the colloidal matter which tends to inhibit crystallization, etc. D. A considerable reduction in plant in the factory at various stations after the defecation tanks, this being the result of points A and B. The filter press capacity required will be reduced proportionally to the reduction in consumption of lime. Also the amount of water used for "sweetening-off" purposes will be reduced, since the amount of press cake is reduced, and therefore less sweet water storage will be required. Also, in regard to refilters (i. e., syrup filters), because of the complete or almost complete removal of colloidal matter the syrup filters will run longer, and hence a smaller number will be required. E. Reduction of the incrustation of the equipment, and greater ease in cleaning the same. This applies to carbonation heaters, plates of the filter presses, and evaporators. F. Large reductions in the dilution of the juice, because of less amount of press cake, and therefore less expense in evaporating. G. Considerable increase in the daily capacity of the factory. If the present process is adopted at an old plant, and if the diffusion battery and plant for the operation thereof are large enough, the existing plant can handle a tonnage in excess of that for which it was designed. H. Reduced cost of the finished product, because of the various items listed above.

It should be noted that the invention is not limited to the particular detailed embodiments thereof which have been described by way of example, but is of considerable scope, as indicated by the accompanying claims.

I claim:

1. A process for the purification of sugar juices, which comprises, determining a point of pH value in the alkaline range at which flocculation of colloids is a maximum when the juice is brought to such point by treatment with alkaline and acid electrolytes, adding alkali to the juice in regulated amount to bring the pH value thereof to substantially said point, and adding an electrolyte of acid reaction in amount insufficient to reduce the pH value of the fluid medium substantially below said point.

2. A process for the purification of sugar juices by the flocculation of colloidal impurities, which comprises, determining the optimum iso-electric point of the colloidal constituents to be flocculated, corresponding to a pH in the alkaline range, adding alkali to the juice in regulated amount to raise the pH value of the mixture substantially to said point with an alkalinity, determined by chemical means, slightly higher than that corresponding to said point, and treating the mixture with an acid electrolyte insufficient in amount to reduce the pH value of the mixture substantially below said point, but sufficient to cause rapid flocculation of the colloids.

3. A process for the purification of sugar juices by the flocculation of colloidal impurities, which comprises, determining the optimum iso-electric point of the colloidal constituents to be flocculated, corresponding to a pH in the alkaline range, and performing the following steps, under suitable application of heat, viz. adding alkali to the juice in regulated amount to raise the pH value of the mixture substantially to said point with an alkalinity, determined by chemical means, slightly higher than that corresponding to said point, and adding, with thorough mixing, liquid sulphur dioxide insufficient in amount to reduce the pH value of the mixture substantially below said point, but sufficient to cause rapid flocculation of the colloids.

4. A process for the purification of sugar juices by the flocculation of colloidal impurities which comprises, determining the optimum iso-electric point of the colloidal impurities to be flocculated, treating the juice with an electrolyte calculated to flocculate certain of the colloids at such point, in amount sufficient substantially to attain such point, and treating the juice with another electrolyte calculated to flocculate others of the colloids at such optimum point, in amount regulated to leave the juice at a pH value substantially equal to that of such optimum point.

5. A process for the purification of sugar juices by the flocculation of colloidal impurities, which comprises determining the optimum iso-electric point of the colloidal constituents to be flocculated, corresponding to a pH in the alkaline range, adding alkali in regulated amount sufficient to bring the alkalinity of the juice, determined by chemical means, to a value slightly higher than that corresponding to the said optimum iso-electric point, and adding sulphur dioxide in regulated amount, to reduce the alkalinity of the mixture without sensibly lowering the pH value of the juice below that of the said point.

6. A process for the purification of sugar juices by the flocculation of colloidal impurities, which comprises determining the optimum iso-electric point of the colloidal constituents to be flocculated, corresponding to a pH in the alkaline range, adding alkali in regulated amount sufficient to bring the alkalinity of the juice, determined by chemical means, to a value slightly higher than that corresponding to the said optimum iso-electric point, and adding an electrolyte of acid reaction in regulated amount to reduce the alkalinity of the mixture without sensibly lowering the pH value of the juice below that of the said point.

7. A process for the purification of sugar juices by the flocculation of the colloidal impurities which comprises determining the optimum iso-electric point of the colloidal constituents to be flocculated, corresponding to a pH in the alkaline range, adding lime in regulated amount sufficient substantially to attain such point, and adding sulphur dioxide in amount insufficient to reduce the pH value of the juice substantially below that of said optimum point.

8. A process for the purification of sugar juices by the flocculation of colloidal impurities which comprises determining the optimum iso-electric point of the colloidal constituents to be flocculated, corresponding to a pH in the alkaline range, adding alkali in regulated amount sufficient substantially to attain such point, to flocculate certain of the colloids, and adding an electrolyte of acid reaction determined in amount to flocculate others of said colloids, and to cause rapid settling of the flocs, at substantially said optimum point.

9. In a process for the purification of sugar juices by the flocculation of colloidal impurities, the steps of determining the optimum iso-electric point of the colloidal constituents to be flocculated, corresponding to a pH in the alkaline range, and adding alkali to the juice in regulated amount sufficient substantially to attain such point, with an alkalinity, determined by chemical means, only slightly higher than corresponding to said point.

10. A process for the purification of sugar beet juices, which comprises, adding alkali to the juice to neutralize the same, if necessary, and a further amount equal to about 2 gms. of calcium oxide per litre of juice, and then adding quickly, with thorough mixing, liquid sulphur dioxide in an amount of the order of 0.1 gm. per litre of juice.

11. A process for the purification of sugar beet juices, which comprises, treating the juices with alkali to bring the hydrogen ion concentration thereof to a value of about pH 10.6 with alkalinity determined by chemical means slightly greater than that corresponding to such pH value, and than treating with an electrolyte of acid reaction in amount insufficient to reduce the pH value of the juices substantially below pH 10.6.

12. A process for the purification of sugar beet juices, which comprises, treating the juices with lime to bring the hydrogen ion concentration thereof to a value of about pH 10.6, with alkalinity determined by chemical means slightly greater than that corresponding to such pH value, and then quickly adding liquid sulphur dioxide in amount insufficient to reduce the pH value of the juices substantially below pH 10.6.

13. A process for the purification of sugar beet juices, which comprises, adding alkali to the juice to neutralize the same if necessary and a further amount equal to about 0.2 per cent of calcium oxide on the juice, then adding, quickly, with thorough mixing, liquid sulphur dioxide in an amount of the order of .01 per cent on the juice, to cause flocculation of colloids, then adding from 0.4 to 1.0 per cent of lime carbonating to precipitate calcium carbonate, and filtering.

14. A process for the purification of sugar juices, which comprises, determining a point of pH value in the alkaline range at which flocculation of colloids is a maximum when the juice is brought to such point by treatment with alkaline and acid electrolytes, adding a suspension of alkali in sugar juice to the juices in regulated amount to bring the pH value thereof substantially to said point, and adding an electrolyte of acid reaction in amount insufficient to reduce the pH value of the fluid medium substantially below said point.

15. In a process for the purification of sugar juices by the flocculation of colloidal impurities, the steps of determining the optimum iso-electric point of the colloidal impurities to be flocculated, corresponding to a pH in the neighbourhood of 10.6, and adding alkali to the juice in regulated amount, of the order of about 0.2 per cent of calcium oxide on the juice, sufficient substantially to attain such point, with an alkalinity, determined by chemical means, only slightly higher than that corresponding to such pH value.

DARIO TEATINI.